(12) United States Patent

Cheng

(10) Patent No.: US 10,513,260 B2
(45) Date of Patent: Dec. 24, 2019

(54) METHOD AND APPARATUS FOR JUDGING VEHICLE DRIVING DIRECTION, DEVICE AND COMPUTER STORAGE MEDIUM

(71) Applicant: BAIDU ONLINE NETWORK TECHNOLOGY (BEIJING) CO., LTD., Haidian District Beijing (CN)

(72) Inventor: Yiyuan Cheng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 12 days.

(21) Appl. No.: 16/022,018

(22) Filed: Jun. 28, 2018

(65) Prior Publication Data

US 2019/0009777 A1 Jan. 10, 2019

(30) Foreign Application Priority Data

Jul. 4, 2017 (CN) .......................... 2017 1 05390271

(51) Int. Cl.
*B60W 30/095* (2012.01)
*G06T 7/20* (2017.01)

(52) U.S. Cl.
CPC .... *B60W 30/0956* (2013.01); *B60W 30/0953* (2013.01); *G06T 7/20* (2013.01); *G06T 2207/10028* (2013.01); *G06T 2207/30252* (2013.01)

(58) Field of Classification Search
CPC . B60W 30/0956; B60W 30/0953; G06T 7/20; G06T 2207/10028; G06T 2207/30252
See application file for complete search history.

(56) References Cited

U.S. PATENT DOCUMENTS

| 2010/0217529 | A1* | 8/2010 | Stroila | .................. | G01S 17/89 702/5 |
|---|---|---|---|---|---|
| 2017/0003685 | A1 | 1/2017 | Pollock | | |

FOREIGN PATENT DOCUMENTS

| CN | 104019825 A | 9/2014 |
|---|---|---|
| CN | 104992145 A | 10/2015 |
| CN | 105956527 A | 9/2016 |
| CN | 106022274 A | 10/2016 |
| CN | 106250912 A | 12/2016 |

(Continued)

OTHER PUBLICATIONS

Chinese Office Action dated Oct. 30, 2019 for related Chinese Appln. No. 201710539027.1; 11 Pages.

*Primary Examiner* — Huy T Nguyen
(74) *Attorney, Agent, or Firm* — Brooks Kushman P.C.

(57) ABSTRACT

The present disclosure provides a method and apparatus for judging a vehicle driving direction, a device and a computer storage medium, wherein the method for judging a vehicle driving direction comprises: obtaining a point cloud subset of the vehicle and candidate orientation angles of the vehicle; respectively determining a minimum enclosing rectangle of top view data in the point cloud subset, in the direction of each candidate orientation angle; determining energy functions corresponding to candidate orientation angles by using distribution properties of respective point clouds in the respective minimum enclosing rectangles relative to the minimum enclosing rectangles; determining the driving direction of the vehicle from the candidate orientation angles, according to the energy functions.

20 Claims, 3 Drawing Sheets

(56) References Cited

FOREIGN PATENT DOCUMENTS

| | | |
|---|---|---|
| CN | 106339997 A | 1/2017 |
| CN | 106407947 A | 2/2017 |
| CN | 106769080 A | 5/2017 |

* cited by examiner

METHOD AND APPARATUS FOR JUDGING VEHICLE DRIVING DIRECTION, DEVICE AND COMPUTER STORAGE MEDIUM

The present application claims the priority of Chinese Patent Application No. 201710539027.1, filed on Jul. 4, 2017, with the title of "Method and apparatus for judging vehicle driving direction, device and computer storage medium". The disclosure of the above applications is incorporated herein by reference in its entirety.

FIELD OF THE DISCLOSURE

The present disclosure relates to the technical field of autonomous vehicles, and particularly to a method and apparatus for judging a vehicle driving direction, a device and a computer storage medium.

BACKGROUND OF THE DISCLOSURE

During autonomous driving of the autonomous vehicle, an environment around a vehicle body of the autonomous vehicle, particularly a driving state of other vehicles around the autonomous vehicle exerts an important influence on autonomous driving policies of the autonomous vehicle such as trajectory tracking, collision prediction and vehicle lane changes. Hence, it is of great importance to obtain the driving directions of other vehicles around the autonomous vehicle in the autonomous driving technologies of the autonomous vehicle.

In the prior art, there are mainly two methods for judging vehicle driving direction: (1) a deep learning method: judging the vehicle driving direction based on deep learning of collected big data; (2) a trajectory-tracking method: judging the vehicle driving direction based on the vehicle's driving trajectory. When the deep learning method is employed, since the collected data is incomplete, it might be impossible to accurately judge the vehicle driving direction in the case of confrontation with sudden situations; when the trajectory-tracking method is employed, judgment can be made only when the vehicle moves; if the vehicle is in a stationary state, judgement of the vehicle driving direction cannot be performed. Hence, it is desirable to provide a vehicle driving direction judging method that is capable of suiting various driving scenarios and accurately obtaining the vehicle driving direction.

SUMMARY OF THE DISCLOSURE

In view of the above, the present disclosure provides a method and apparatus for judging a vehicle driving direction, a device and a computer storage medium, to implement accurate judgment of driving directions of other vehicles around a vehicle body of the autonomous vehicle under various driving scenarios, and thereby improve safety of autonomous driving of the autonomous vehicle.

A technical solution employed by the present disclosure to solve the technical problem provides a method for judging a vehicle driving direction, the method comprising: obtaining a point cloud subset of the vehicle and candidate orientation angles of the vehicle; respectively determining a minimum enclosing rectangle of top view data in the point cloud subset, in the direction of each candidate orientation angle; determining energy functions corresponding to candidate orientation angles by using distribution properties of respective point clouds in the respective minimum enclosing rectangles relative to the minimum enclosing rectangles; determining the driving direction of the vehicle from the candidate orientation angles, according to the energy functions.

According to a preferred embodiment of the present disclosure, the point cloud subset of the vehicle is obtained in the following manner: obtaining point cloud data collected by collecting devices of an autonomous vehicle; after merging the point cloud data, clustering the merged point cloud data to obtain the point cloud subset with an object as a unit; recognizing and classifying the point cloud subset, and obtaining the point cloud subset of the vehicle.

According to a preferred embodiment of the present disclosure, the candidate orientation angle of the vehicle is obtained in the following manner: dividing an omnidirectional angle with a preset angle unit, and regarding the obtained angles as the candidate orientation angles respectively; or obtaining image data including vehicle driving information, and determining the candidate orientation angle according to vehicle driving speed and direction in top m frames of image data, wherein m is a preset positive integer; or determining the candidate orientation angle according to a direction of each edge of a convex polygon corresponding to the point cloud subset of the vehicle.

According to a preferred embodiment of the present disclosure, the distribution properties of respective point clouds in the respective minimum enclosing rectangles relative to the minimum enclosing rectangles include: at least one of area, width-to-length ratio, symmetry of the minimum enclosing rectangles, an average value of shortest distances between point clouds and edges of the minimum enclosing rectangles, and an average value of distances between point clouds and central axes of the minimum enclosing rectangles.

According to a preferred embodiment of the present disclosure, the determining energy functions corresponding to candidate orientation angles by using distribution properties of respective point clouds in the respective minimum enclosing rectangles relative to the minimum enclosing rectangles comprises: performing weighting processing for types of distribution properties of respective point clouds in the minimum enclosing rectangles relative to the minimum enclosing rectangles, and obtaining energy functions of candidate orientation angles corresponding to the minimum enclosing rectangles.

According to a preferred embodiment of the present disclosure, the vehicle comprises an automobile; the determining the driving direction of the vehicle from the candidate orientation angles, according to the energy functions comprises: obtaining slopes of a front end and a rear end of the automobile vehicle according to side view data in the point cloud subset, and determining the head of the automobile vehicle according to the slopes; determining the driving direction of the automobile vehicle according to the head of the automobile vehicle and the energy functions corresponding to the candidate orientation angles.

According to a preferred embodiment of the present disclosure, the vehicle comprises a non-automobile vehicle; the determining the driving direction of the vehicle from the candidate orientation angles, according to the energy functions comprises: obtaining image data including driving information of the non-automobile vehicle; determining a head of the non-automobile vehicle according to driving speed and direction of the non-automobile vehicle in top n frames of image data; determining the driving direction of the non-automobile vehicle according to the head of the non-automobile vehicle and the energy functions corresponding to the candidate orientation angles.

According to a preferred embodiment of the present disclosure, the symmetry of the minimum enclosing rectangles is obtained in the following manner: obtaining symmetry of point clouds in the minimum enclosing rectangles with a transverse central axis as a symmetry axis and with a longitudinal central axis as a symmetry axis; selecting a larger symmetry from symmetries corresponding to the transverse central axis and longitudinal central axis, as a symmetry of the minimum enclosing rectangles.

According to a preferred embodiment of the present disclosure, the determining the driving direction of the vehicle from the candidate orientation angles, according to the energy functions further comprises: according to the minimum enclosing rectangle corresponding to the determined orientation angle of the vehicle, calculating an average value of shortest distances between point clouds in the minimum enclosing rectangle and edges, or an average value of distances between point clouds and a central axis; according to the average value, obtaining a confidence of the determined driving direction of the vehicle, wherein the smaller the average value is, the larger the confidence is.

A technical solution employed by the present disclosure to solve the technical problem provides an apparatus for judging a vehicle driving direction, the apparatus comprising: an obtaining unit configured to obtain a point cloud subset of the vehicle and candidate orientation angles of the vehicle; a first determining unit configured to respectively determine a minimum enclosing rectangle of top view data in the point cloud subset, in the direction of each candidate orientation angle; a second determining unit configured to determine energy functions corresponding to candidate orientation angles by using distribution properties of respective point clouds in the respective minimum enclosing rectangles relative to the minimum enclosing rectangles; a third determining unit configured to determine the driving direction of the vehicle from the candidate orientation angles, according to the energy functions.

According to a preferred embodiment of the present disclosure, upon obtaining the point cloud subset of the vehicle, the obtaining unit specifically performs: obtaining point cloud data collected by collecting devices of an autonomous vehicle; after merging the point cloud data, clustering the merged point cloud data to obtain the point cloud subset with an object as a unit; recognizing and classifying the point cloud subset, and obtaining the point cloud subset of the vehicle.

According to a preferred embodiment of the present disclosure, upon obtaining the candidate orientation angle of the vehicle, the obtaining unit specifically performs: dividing an omnidirectional angle with a preset angle unit, and regarding the obtained angles as the candidate orientation angles respectively; or obtaining image data including vehicle driving information, and determining the candidate orientation angle according to the vehicle driving speed and direction in top m frames of image data, wherein m is a preset positive integer; or determining the candidate orientation angle according to a direction of each edge of a convex polygon corresponding to the point cloud subset of the vehicle.

According to a preferred embodiment of the present disclosure, upon determining energy functions corresponding to candidate orientation angles by using distribution properties of respective point clouds in the respective minimum enclosing rectangles relative to the minimum enclosing rectangles, the second determining unit specifically performs: performing weighting processing for types of distribution properties of respective point clouds in the minimum enclosing rectangles relative to the minimum enclosing rectangles and obtaining energy functions of candidate orientation angles corresponding to the minimum enclosing rectangles.

According to a preferred embodiment of the present disclosure, the vehicle comprises an automobile; before determine the driving direction of the vehicle from the candidate orientation angles, according to the energy functions, the third determining unit further performs: obtaining slopes of a front end and a rear end of the automobile vehicle according to side view data in the point cloud subset, and determining the head of the automobile vehicle according to the slopes; determining the driving direction of the automobile vehicle according to the head of the automobile vehicle and the energy functions corresponding to the candidate orientation angles.

According to a preferred embodiment of the present disclosure, the vehicle comprises a non-automobile vehicle; before determine the driving direction of the vehicle from the candidate orientation angles, according to the energy functions, the third determining unit further performs: obtaining image data including driving information of the non-automobile vehicle; determining a head of the non-automobile vehicle according to driving speed and direction of the non-automobile vehicle in top n frames of image data; determining the driving direction of the non-automobile vehicle according to the head of the non-automobile vehicle and the energy functions corresponding to the candidate orientation angles.

According to a preferred embodiment of the present disclosure, after determining the driving direction of the vehicle from the candidate orientation angles, according to the energy functions, the third determining unit further performs: according to the minimum enclosing rectangle corresponding to the determined orientation angle of the vehicle, calculating an average value of shortest distances between point clouds in the minimum enclosing rectangle and edges, or an average value of distances between point clouds and a central axis; according to the average value, obtaining a confidence of the determined driving direction of the vehicle, wherein the smaller the average value is, the larger the confidence is.

As can be seen from the above technical solutions of the present disclosure, the energy functions are calculated, and the driving direction of the vehicle is determined according to candidate orientation angles corresponding to the energy functions, to implement accurate judgment of driving directions of other vehicles around a vehicle body of the autonomous vehicle under various driving scenarios, and thereby improve safety of autonomous driving of the autonomous vehicle.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when (stated condition or event) is detected" or "responsive to detecting (stated condition or event)".

During autonomous driving of the autonomous vehicle, to work out an accurate driving policy, it is necessary to judge the driving directions of various vehicles in the surrounding environment and thereby ensure the autonomous driving safety of the autonomous vehicle. Since automobile vehicles (e.g., ordinary cars) and non-automobile vehicles (e.g., motorcycles and bicycles) in the surrounding environment have different structure features, the present disclosure provides a method and apparatus for judging a vehicle driving direction, a device and a computer storage medium with respect to automobile vehicles and non-automobile vehicles, achieves accurate acquisition of driving directions of vehicles around the autonomous vehicle in various driving scenarios, and thereby improves the autonomous driving safety of the autonomous vehicle.

Figure 1:
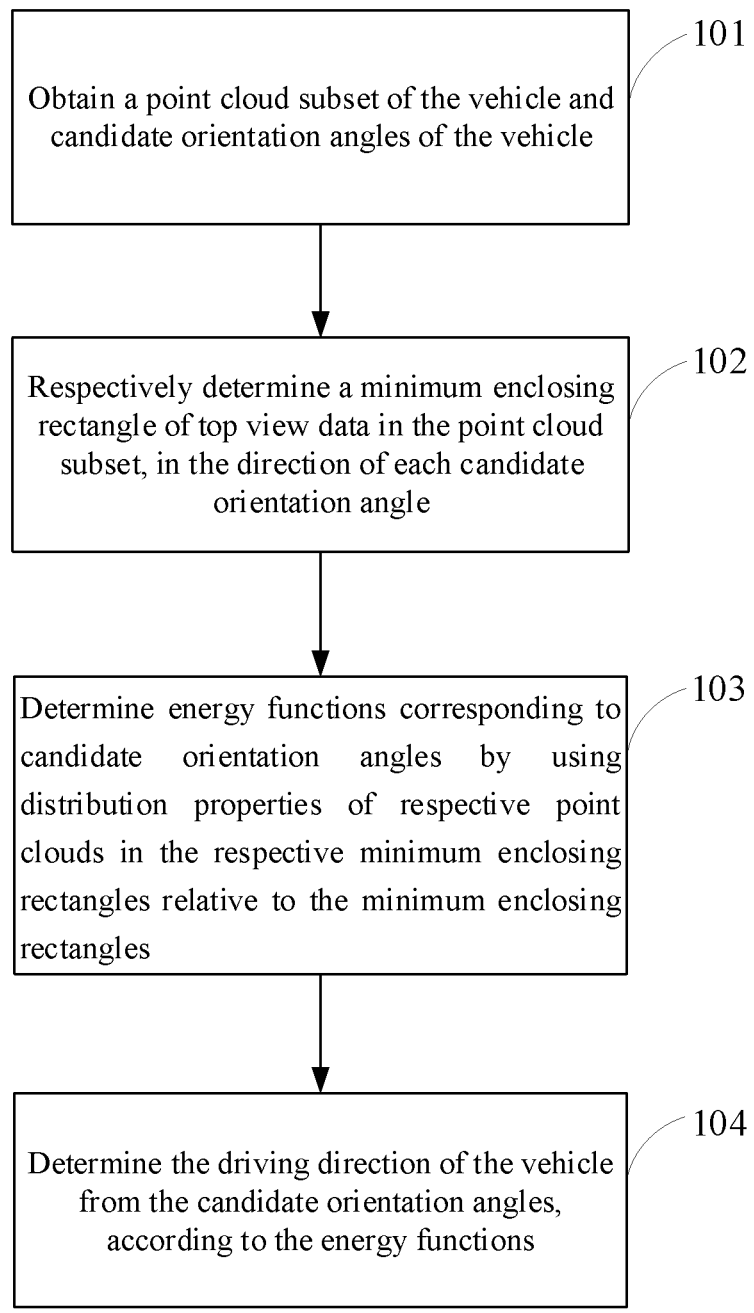
FIG. 1 is a flow chart of a method of judging a vehicle driving direction according to an embodiment of the present disclosure.

FIG. 1 is a flow chart of a method of judging a vehicle driving direction according to an embodiment of the present disclosure. As shown in FIG. 1, the method comprises:

In 101 is obtained a point cloud subset of the vehicle and candidate orientation angles of the vehicle.

In this step, the obtained point cloud subset of the vehicle is a point cloud subset of vehicles around the vehicle body of the autonomous vehicle, and includes a point cloud subset of automobile vehicles and a point cloud subset of non-automobile vehicles; the obtained candidate orientation angles of the vehicle are orientation angles corresponding to all possible driving directions of the vehicle.

Specifically, it is possible to obtain the point cloud subset of the vehicle in the following manner:

First, position and posture calibration is performed for all collecting devices on the autonomous vehicle. The collecting devices on the autonomous vehicle comprise a laser radar device and a camera device. Upon performing position and posture calibration for the collecting devices, it is feasible to respectively make radar device coordinates and camera device coordinates consistent with a world coordinate system so that point cloud data output by all collecting devices can correspond one to one. After the position and posture calibration of the collecting devices is completed, since the collecting devices collect point cloud data around the vehicle body of the autonomous vehicle, the point cloud data collected by the collecting devices are merged to make the point cloud information around the vehicle body of the autonomous vehicle more complete. After the merged point cloud data are obtained, it is possible to cluster the merged point cloud data by a point cloud cluster algorithm to obtain a point cloud subset with an object as a unit, namely, each point cloud subset represents an object. Then it is possible to recognize and classify point cloud subsets corresponding to objects to thereby determine specific types of objects corresponding to respective point cloud subsets, for example, automobile vehicles, or non-automobile vehicles or a green belt.

After point cloud subsets corresponding to different types of objects are obtained, it is further possible to perform noise reduction processing for respective point cloud subsets, wherein noise reduction processing comprises height limitation processing, edge smoothing processing, and point cloud distribution consistency processing. It is possible to, through the noise reduction processing of respective point cloud subsets, effectively reduce a calculation deviation caused by factors such as noise, division errors or local convergence, and further improve the accuracy of calculating the vehicle driving direction.

Specifically, regarding the obtained candidate orientation angles of the vehicle, it is feasible to divide an omnidirectional angle with a preset angle unit, and then regard the obtained angles as the candidate orientation angles respectively, i.e., regard each angle divided from 0°-360° with a preset angle unit as a candidate orientation angle of the vehicle. For example, when the preset angle unit is 1°, each angle in 0°, 1°, 2°, . . . 360° is regarded as the candidate orientation angle of the vehicle. It is also feasible to, after image data including vehicle driving information being obtained, determine the candidate orientation angle of the vehicle according to the vehicle driving speed and direction in top m frames of image data, wherein m is a preset positive integer. For example, if the vehicle driving direction is determined as 90° according to the top m frames of image data, the candidate orientation angle of the vehicle may be a preset angle interval including the determined driving direction, for example 80°-100°, and the candidate orientation angle corresponding to the vehicle is any angle in the interval 80°-100°. It is also possible to determine the candidate orientation angle of the vehicle according to a direction of each edge of a convex hull corresponding to the point cloud subset, or a direction of each edge of a convex polygon corresponding to the point cloud subset. In the present disclosure, a preset angle unit between the candidate orientation angles of the vehicle may be 1°, or 0.1°. This is not limited in the present disclosure.

102 relates to respectively determining a minimum enclosing rectangle of top view data in the point cloud subset, in the direction of each candidate orientation angle.

In this step, it is feasible to, according to the obtained candidate orientation angles of the vehicle and the point cloud subset, determine a minimum enclosing rectangle of top view data in the vehicle point cloud subset in respective candidate orientation angles, namely, obtain a minimum enclosing rectangle corresponding to the top view data in the vehicle point cloud subset at respective candidate orientation angles, the respective candidate orientation angles corresponding to a minimum enclosing rectangle respectively. The respective minimum enclosing rectangles are minimum rectangles which enclose top view data in the vehicle point cloud subset in respective directions, and the minimum enclosing rectangles may be directly obtained by using already-existing codes. Details are not presented here.

In 103, energy functions corresponding to candidate orientation angles are determined by using distribution properties of respective point clouds in the respective minimum enclosing rectangles relative to the minimum enclosing rectangles.

In this step, it is feasible to perform weighting processing for types of distribution properties of respective point clouds in the respective minimum enclosing rectangles relative to the minimum enclosing rectangles and thereby obtain energy functions of candidate orientation angles corresponding to respective minimum enclosing rectangles. The distribution properties of respective point clouds in the respective minimum enclosing rectangles relative to the minimum enclosing rectangles include: at least one of area, width-to-length ratio, symmetry of the minimum enclosing rectangles, an average value of shortest distances between point clouds and edges of the minimum enclosing rectangles, and an average value of distances between point clouds and central axes of the minimum enclosing rectangles. The distribution properties of respective point clouds in the respective minimum enclosing rectangles relative to the minimum enclosing rectangles reflect a matching degree between the vehicle point cloud data and the minimum enclosing rectangle.

Specifically, if the area of the minimum enclosing rectangle is smaller, the matching degree of the point cloud data at the surface of the vehicle and the minimum enclosing rectangle is higher; if the width-to-length ratio is smaller, the matching degree of the point cloud data at the surface of the vehicle and the minimum enclosing rectangle is higher. Likewise, if the average value of shortest distances between point clouds and edges of the minimum enclosing rectangles, and the average value of distances between point clouds and central axes of the minimum enclosing rectangles are smaller, the matching degree of the point cloud data at the surface of the vehicle and the minimum enclosing rectangle is higher. The area and the width-to-length ratio of the minimum enclosing rectangles, the average value of shortest distances between point clouds and edges of the minimum enclosing rectangles, and the average value of distances between point clouds and central axes of the minimum enclosing rectangles may be directly obtained through codes, for example, obtained through a regionprops function in matlab. No details are presented here.

The symmetry of minimum enclosing rectangles corresponding to respective candidate orientation angles may be obtained in the following manner: according to minimum enclosing rectangles corresponding to respective candidate orientation angles, obtain symmetry of point clouds in the minimum enclosing rectangles with a transverse central axis as a symmetry axis and with a longitudinal central axis as a symmetry axis respectively, and then select a larger symmetry from symmetries corresponding to the transverse central axis and longitudinal central axis, as a symmetry of the minimum enclosing rectangles.

The symmetry of the minimum enclosing rectangle may be obtained in the following manner if the point clouds in the minimum enclosing rectangle take the transverse central axis as the symmetry axis:

if $(p_{(x,y)} \& \& p_{(x\pm\delta,(width-y)\pm\delta)})$symmetry++

The symmetry of the minimum enclosing rectangle may be obtained in the following manner if the point clouds in the minimum enclosing rectangle take the longitudinal central axis as the symmetry axis:

if $(p_{(x,y)} \& \& p_{((length-x)\pm\delta, y\pm\delta)})$symmetry++

In the formula, p represents a point cloud in the minimum enclosing rectangle; x and y respectively represent a transverse distance and a longitudinal distance of the point cloud away from the nearest edge of the minimum enclosing rectangle; δ represents a lookup scope and may be adjusted according to specific situations; a length of top view data in the vehicle point cloud subset is considered as a bottom side by default, length represents a length of the minimum enclosing rectangle, and width represents a width of the minimum enclosing rectangle; symmetry is symmetry with an initial value 0.

For example, description is presented by taking an example of obtaining symmetry of the point clouds in the minimum enclosing rectangle with the transverse central axis as a symmetry axis, namely, symmetry of point clouds in the upper portion and lower portion in the minimum enclosing rectangle. In the formula, the initial value of the symmetry is 0. When the point clouds in the minimum enclosing rectangle take the transverse central axis as the symmetry axis, and a cloud point $p_{(x\pm\delta,(width-y)\pm\delta)}$ symmetrical with the point cloud $p_{(x,y)}$ can be found, 1 is added to symmetry. δ represents a lookup range, i.e., the point cloud symmetrical with the point cloud $p_{(x,y)}$ is not certainly completely symmetrical about the transverse central axis. If in the range of δ, there is the point cloud $p_{(x\pm\delta,(width-y)\pm\delta)}$ symmetrical with the point cloud $p_{(x,y)}$, it still may be believed that $p_{(x,y)}$ has a symmetrical point, and 1 is added to the value of symmetry.

After symmetries of point clouds in the minimum enclosing rectangle with the transverse central axis and longitudinal central axis as the symmetry axis are obtained respectively, a larger symmetry in the obtained two symmetries is considered as the symmetry of the minimum enclosing rectangle.

Through this step, it is possible to calculate energy functions corresponding to respective vehicle candidate orientation angles after obtaining the area and width-to-length ratio of the minimum enclosing rectangles corresponding to the rectangle, the average value of shortest distances between point clouds and edges of the minimum enclosing rectangles, the average value of distances between point clouds and central axes of the minimum enclosing rectangles, and symmetry. The energy functions reflect the matching degree of the minimum enclosing rectangles and the vehicle point cloud data, namely, the matching degree of the candidate orientation angles and an actual driving direction. If the matching degree is larger, the energy function of the candidate orientation angle is smaller. Hence, in the present disclosure, preferably, the candidate orientation angle corresponding to a minimum value of the energy function is selected as the driving direction of the vehicle.

Specifically, it is possible to calculate the energy function of the candidate orientation angles of the automobile vehicle by using the following equation:

$$E_{dir} = \omega_1 \times area + \omega_2 \times width/length + \omega_3 \times ave(distance(point,edg)) + \omega_4 \times symmetry$$

where $E_{dir}$ represents the energy function of a certain candidate orientation angle; $\omega_1$, $\omega_2$, $\omega_3$, $\omega_4$ represent weight values, and may be adjusted according to specific situations; area represents the area of the minimum enclosing rectangle corresponding to the candidate orientation angle; width/length represents the width-to-length ratio of the minimum enclosing rectangle corresponding to the candidate orientation angle; ave(distance(point, edg)) represents the average value of distances between point clouds in the minimum enclosing rectangle corresponding to the candidate orientation angle and edges; symmetry represents the symmetry of the minimum enclosing rectangle corresponding to the candidate orientation angle.

Specifically, it is possible to calculate the energy function of the candidate orientation angles of the non-automobile vehicle by using the following equation:

$$E_{dir}=(\omega_1 \times area + \omega_2 \times width/length + \omega_3 \times ave(distance(point, central\_axis)) + \omega_4 \times symmetry)$$

where $E_{dir}$ represents the energy function of a certain candidate orientation angle; $\omega_1$, $\omega_2$, $\omega_3$, $\omega_4$ represent weight values, and may be adjusted according to specific situations; area represents the area of the minimum enclosing rectangle corresponding to the candidate orientation angle; width/length represents the width-to-length ratio of the minimum enclosing rectangle corresponding to the candidate orientation angle; ave(distance(point, central_axis)) represents the average value of distances between point clouds in the minimum enclosing rectangle corresponding to the candidate orientation angle and the central axis; symmetry represents the symmetry of the minimum enclosing rectangle corresponding to the candidate orientation angle.

After the energy functions of candidate orientation angles of the automobile vehicles and non-automobile vehicles are obtained using different equations, the driving directions of the automobile vehicles and non-automobile vehicles can be determined according to the energy functions of candidate orientation angles.

In 104, the driving direction of the vehicle is determined from the candidate orientation angles, according to the energy functions.

Since the energy functions reflect the matching degree of the candidate orientation angles corresponding to the minimum enclosing rectangle of the vehicle and the actual driving direction, the driving direction of the vehicle is determined according to the energy functions obtained from calculation.

The determining the driving direction of the vehicle from the candidate orientation angle according to the energy functions further comprise: judging a head and a tail of the vehicle. This is because there might occur a situation the energy functions are equal in magnitude upon calculating the energy functions. For example, if the candidate orientation angle is an omnidirectional angle, if the energy function of 0° obtained from calculation is equal to the energy function of 180° in magnitude, the accurate driving direction of the vehicle cannot be judged. Therefore, it is impossible to implement accurate judgment of the driving direction of the vehicle by only using the energy functions of the candidate orientation angles of the vehicle. Therefore, it is necessary to further judge the head and tail of the vehicle and thereby more accurately determine the driving direction of the vehicle. Since the automobile vehicles and non-automobile vehicles have different appearance and structures, the heads and tails of the automobile vehicles and non-automobile vehicles are judged in different manners.

Figure 2:
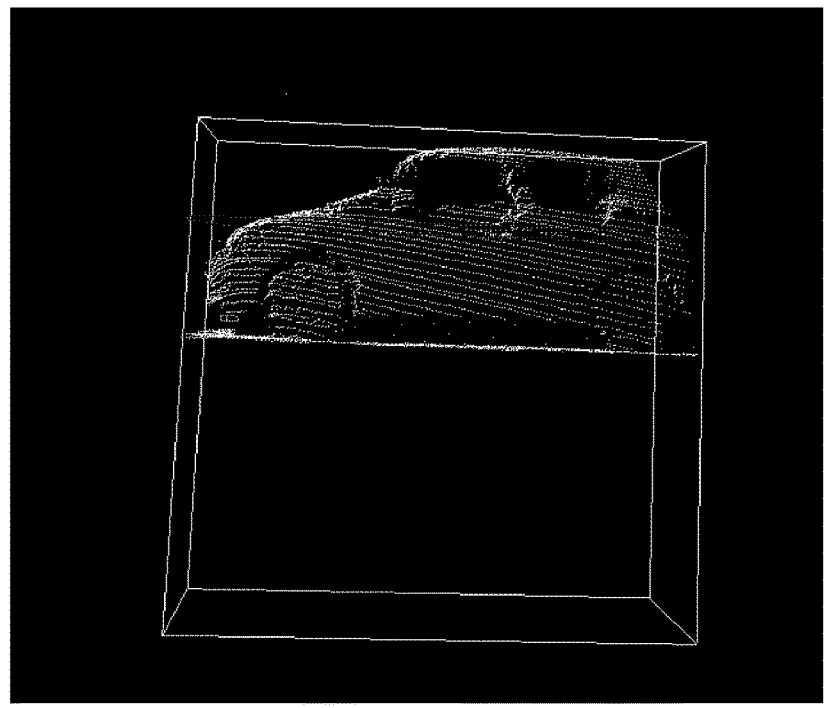
FIG. 2 is side view data of a point cloud subset of an automobile vehicle according to an embodiment of the present disclosure.

Specifically, the head of the automobile vehicle may be judged in the following manner: obtaining slopes of a front end and a rear end of the automobile vehicle according to side view data in the point cloud subset of the automobile vehicle, and determining the head of the automobile vehicle according to the obtained slopes. An end with the larger slope is the head of the vehicle, and the other end is the tail of the vehicle. As shown in FIG. 2, Fig. shows side view data of point clouds of the automobile vehicle. It can be clearly seen from FIG. 2 that the slopes of point clouds on the left side are larger than those of the point clouds on the right side, so the left side of the automobile vehicle in FIG. 2 is determined as the head of the automobile vehicle.

Specifically, the head of the non-automobile vehicle may be judged in the following manner: obtaining image data including the driving information of the non-automobile vehicle; determining the head of the non-automobile vehicle according to the driving speed and direction of the non-automobile vehicle in top n frames of image data. This is because the non-automobile device (e.g., motorcycle or bicycle) has a front-back symmetry, and the head of the automobile vehicle cannot be determined from the slopes of the front end and the back end. Therefore, the head of the non-automobile vehicle is determined according to the driving speed and direction of the non-automobile vehicle.

After the head of the vehicle is obtained, the vehicle's driving direction can be determined according to the energy functions corresponding to respective candidate orientation angles.

For example, if values of energy functions obtained from the candidate orientation angle 0° and candidate orientation angle 180° are the smallest and equal, and if the head of the vehicle is consistent with the driving direction of the autonomous vehicle, it is determined that the driving direction of the vehicle is 0°; if the head of the vehicle is opposite to the driving direction of the autonomous vehicle, it is determined that the driving direction of the vehicle is 180°.

Certainly, it may be understood that if the candidate orientation angle determined from comparison of vehicles, or the value of the energy function corresponding to the candidate orientation angle is sole, the driving direction of the vehicle can be directly determined according to the energy function of the candidate orientation angle.

After the driving direction of the vehicle is obtained, a confidence of the obtained driving direction of the vehicle may be calculated. Specifically, it is feasible to, according to the minimum enclosing rectangle corresponding to the determined orientation angle of the vehicle, calculate an average value of shortest distances between point clouds in the minimum enclosing rectangle and edges of the minimum enclosing rectangles, or an average value of distances between point clouds and the central axis in the minimum enclosing rectangle; according to the average value obtained from calculation, obtaining the confidence of the determined driving direction of the vehicle, wherein the smaller the average value is, the larger the confidence is.

Specifically, the confidence of the driving direction of the automobile vehicle may be obtained using the following equation:

$$confidence=1/ave(min(distance(point, edg)))$$

where confidence represents the confidence of the driving direction of the automobile vehicle; and ave(min(distance(point, edg))) represents the average value of shortest distances between each point cloud in the minimum enclosing rectangle and each edge.

Specifically, the confidence of the driving direction of the non-automobile vehicle may be obtained using the following equation:

$$confidence=1/ave(distance(point, central\_axis))$$

where confidence represents the confidence of the driving direction of the non-automobile vehicle; and ave(distance (point, central_axis)) represents the average value of distances between each point cloud in the minimum enclosing rectangle and the central axis.

The confidence obtained from calculation is regarded as a judging criterion of the driving direction of the vehicle. The larger the obtained confidence is, the more accurate the obtained vehicle driving direction is; the smaller the obtained confidence is, the less accurate the obtained vehicle driving direction is.

Figure 3:
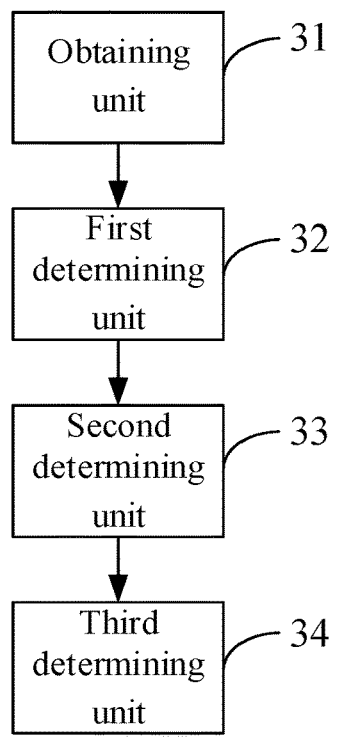
FIG. 3 is a block diagram of an apparatus of judging a vehicle driving direction according to an embodiment of the present disclosure.

FIG. 3 is a block diagram of an apparatus of judging a vehicle driving direction according to an embodiment of the present disclosure. As shown in FIG. 3, the apparatus comprises: an obtaining unit 31, a first determining unit 32, a second determining unit 33 and a third determining unit 34.

The obtaining unit 31 is configured to obtain a point cloud subset of the vehicle and candidate orientation angles of the vehicle.

The point cloud subset of the vehicle obtained by the obtaining unit 31 is a point cloud subset of vehicles around the autonomous vehicle, and includes a point cloud subset of automobile vehicles and a point cloud subset of non-automobile vehicles; the candidate orientation angles of the vehicle obtained by the obtaining unit 31 are orientation angles corresponding to all possible driving directions of the vehicle.

Specifically, the obtaining unit 31 may obtain the point cloud subset of the vehicle in the following manner:

First, position and posture calibration is performed for all collecting devices on the autonomous vehicle. The collecting devices on the autonomous vehicle comprise a laser radar device and a camera device. Upon performing position and posture calibration for the collecting devices, it is feasible to respectively make radar device coordinates and camera device coordinates consistent with a world coordinate system so that point cloud data output by all collecting devices can correspond one to one. After the position and posture calibration of the collecting devices is completed, since the collecting devices collect point cloud data around the vehicle body of the autonomous vehicle, the point cloud data collected by the collecting devices are merged to make the point cloud information around the vehicle body of the autonomous vehicle more complete. After the merged point cloud data are obtained, it is possible to cluster the merged point cloud data by a point cloud cluster algorithm to obtain a point cloud subset with an object as a unit, namely, each point cloud subset represents an object. Then it is possible to recognize and classify point cloud subsets corresponding to objects to thereby determine specific types of objects corresponding to respective point cloud subsets, for example, automobile vehicles, or non-automobile vehicles or a green belt.

After point cloud subsets corresponding to different types of objects are obtained, the obtaining unit 31 is further configured to perform noise reduction processing for respective point cloud subsets, wherein noise reduction processing comprises height limitation processing, edge smoothing processing, and point cloud distribution consistency processing. It is possible to, through the noise reduction processing of respective point cloud subsets, effectively reduce a calculation deviation caused by factors such as noise, division errors or local convergence, and further improve the accuracy of calculating the vehicle driving direction.

Specifically, regarding the candidate orientation angles of the vehicle obtained by the obtaining unit 31, it is feasible to divide an omnidirectional angle with a preset angle unit, and then regard the obtained angles as the candidate orientation angles respectively, i.e., regard each angle divided from 0°-360° with a preset angle unit as a candidate orientation angle of the vehicle. For example, when the preset angle unit is 1°, the obtaining unit 31 regards each angle in 0°, 1°, 2°, . . . 360° as the candidate orientation angle of the vehicle. After obtaining image data including vehicle driving information, the obtaining unit 31 determines the candidate orientation angle of the vehicle according to the vehicle driving speed and direction in top m frames of image data, wherein m is a preset positive integer. For example, if the vehicle driving direction is determined as 90° according to the top m frames of image data, the candidate orientation angles of the vehicle may be a preset angle interval including the determined driving direction, for example 80°-100°, and the candidate orientation angle corresponding to the vehicle is any angle in the interval 80°-100°. It is also possible that the obtaining unit 31 determines the candidate orientation angle of the vehicle according to a direction of each edge of a convex hull corresponding to the point cloud subset, or a direction of each edge of a convex polygon corresponding to the point cloud subset. In the present disclosure, a preset angle unit between the candidate orientation angles of the vehicle may be 1°, or 0.1°. This is not limited in the present disclosure.

The first determining unit 32 is configured to respectively determine a minimum enclosing rectangle of top view data in the point cloud subset, in the direction of each candidate orientation angle.

The first determining unit 32, according to the obtained candidate orientation angles of the vehicle and the point cloud subset, determines a minimum enclosing rectangle of top view data in the vehicle point cloud subset in the direction of respective candidate orientation angles, namely, the first determining unit 32 obtains a minimum enclosing rectangle corresponding to the top view data in the vehicle point cloud subset at respective candidate orientation angles, different candidate orientation angles corresponding to different minimum enclosing rectangles. The respective minimum enclosing rectangles are minimum rectangles which enclose top view data in the vehicle point cloud subset in respective directions, and the minimum enclosing rectangles may be directly obtained by using already-existing codes. Details are not presented here.

The second determining unit 33 is configured to determine energy functions corresponding to candidate orientation angles by using distribution properties of respective point clouds in the respective minimum enclosing rectangles relative to the minimum enclosing rectangles.

The second determining unit 33 performs weighting processing for types of distribution properties of respective point clouds in the respective minimum enclosing rectangles relative to the minimum enclosing rectangles and thereby obtains energy functions of candidate orientation angles corresponding to respective minimum enclosing rectangles. The distribution properties of respective point clouds in the respective minimum enclosing rectangles include: at least one of area, width-to-length ratio, symmetry of the minimum enclosing rectangles, an average value of shortest distances between point clouds and edges of the minimum enclosing rectangles, and an average value of distances between point clouds and central axes of the minimum enclosing rectangles. The distribution properties of respective point clouds in the respective minimum enclosing rectangles relative to the minimum enclosing rectangles reflect a matching degree between the vehicle point cloud data and the minimum enclosing rectangle.

Specifically, if the area of the minimum enclosing rectangle is smaller, the matching degree of the point cloud data at the surface of the vehicle and the minimum enclosing rectangle is higher; if the width-to-length ratio is smaller, the matching degree of the point cloud data at the surface of the vehicle and the minimum enclosing rectangle is higher. Likewise, if the average value of shortest distances between point clouds and edges of the minimum enclosing rectangles, and the average value of distances between point clouds and central axes of the minimum enclosing rectangles are smaller, the matching degree of the point cloud data at the surface of the vehicle and the minimum enclosing rectangle is higher. The area and the width-to-length ratio of the minimum enclosing rectangles, the average value of shortest distances between point clouds and edges of the minimum enclosing rectangles, and the average value of distances between point clouds and central axes of the minimum enclosing rectangles may be directly obtained through codes, for example, obtained through a regionprops function in matlab. No details are presented here.

The symmetry of minimum enclosing rectangles corresponding to respective candidate orientation angles may be obtained by the second determining unit 33 in the following manner: according to minimum enclosing rectangles corresponding to respective candidate orientation angles, obtain symmetry of point clouds in the minimum enclosing rectangles with a transverse central axis as a symmetry axis and with a longitudinal central axis as a symmetry axis respectively, and then select a larger symmetry from symmetries corresponding to the transverse central axis and longitudinal central axis, as a symmetry of the minimum enclosing rectangles.

The symmetry of the minimum enclosing rectangle may be obtained in the following manner if the point clouds in the minimum enclosing rectangle take the transverse central axis as the symmetry axis:

if $(p_{(x,y)}$ & $p_{(x\pm\delta,(width-y)\pm\delta)})$symmetry++

The symmetry of the minimum enclosing rectangle may be obtained in the following manner if the point clouds in the minimum enclosing rectangle take the longitudinal central axis as the symmetry axis:

if $(p_{(x,y)}$ & $p_{((length-x)\pm\delta,y\pm\delta)})$symmetry++

In the formula, p represents a point cloud in the minimum enclosing rectangle; x and y respectively represent a transverse distance and a longitudinal distance of the point cloud away from the nearest edge of the minimum enclosing rectangle; δ represents a lookup scope and may be adjusted according to specific situations; a length of top view data in the vehicle point cloud subset is considered as a bottom side by default, length represents a length of the minimum enclosing rectangle, and width represents a width of the minimum enclosing rectangle; symmetry is symmetry with an initial value 0.

For example, description is presented by taking an example in which the second determining unit 33 obtains symmetry of the point clouds in the minimum enclosing rectangle with the transverse central axis as a symmetry axis, namely, symmetry of point clouds in the upper portion and lower portion in the minimum enclosing rectangle. In the formula, the initial value of the symmetry is 0. When the point clouds in the minimum enclosing rectangle take the transverse central axis as the symmetry axis, and a cloud point $p_{(x+\delta,(width-y)+\delta)}$ symmetrical with the point cloud $p_{(x,y)}$ can be found, 1 is added to symmetry. δ represents a lookup range, i.e., the point cloud symmetrical with the point cloud $p_{(x,y)}$ is not certainly completely symmetrical about the transverse central axis. If in the range of δ, there is the point cloud $p_{(x\pm\delta,(width-y)\pm\delta)}$ symmetrical with the point cloud $p_{(x,y)}$, it still may be believed that $p_{(x,y)}$ has a symmetrical point, and 1 is added to the value of symmetry.

After symmetries of point clouds in the minimum enclosing rectangle with the transverse central axis and longitudinal central axis as the symmetry axis are obtained respectively, the second determining unit 33 considers a larger symmetry in the obtained two symmetries as the symmetry of the minimum enclosing rectangle.

Through this step, the second determining unit 33 calculates energy functions corresponding to respective vehicle candidate orientation angles after obtaining the area and width-to-length ratio of the minimum enclosing rectangles corresponding to the rectangle, the average value of shortest distances between point clouds and edges of the minimum enclosing rectangles, the average value of distances between point clouds and central axes of the minimum enclosing rectangles, and symmetry. The energy functions reflect the matching degree of the minimum enclosing rectangles and the vehicle point cloud data, namely, the matching degree of the candidate orientation angles and an actual driving direction. If the matching degree is larger, the energy function of the candidate orientation angle is smaller. Hence, in the present disclosure, preferably, the candidate orientation angle corresponding to a minimum value of the energy function is selected as the driving direction of the vehicle.

Specifically, it is possible to calculate the energy function of the candidate orientation angles of the automobile vehicle by using the following equation:

$$E_{dir}=(\omega_1 \times area+\omega_2 \times width/length+\omega_3 \times ave(distance(point,edg))+\omega_4 \times symmetry)$$

where $E_{dir}$ represents the energy function of a certain candidate orientation angle; $\omega_1$, $\omega_2$, $\omega_3$, $\omega_4$ represent weight values, and may be adjusted according to specific situations; area represents the area of the minimum enclosing rectangle corresponding to the candidate orientation angle; width/length represents the width-to-length ratio of the minimum enclosing rectangle corresponding to the candidate orientation angle; ave(distance(point, edg)) represents the average value of distances between point clouds in the minimum enclosing rectangle corresponding to the candidate orientation angle and edges; symmetry represents the symmetry of the minimum enclosing rectangle corresponding to the candidate orientation angle.

Specifically, it is possible to calculate the energy function of the candidate orientation angles of the non-automobile vehicle by using the following equation:

$$E_{dir}=(\omega_1 \times area+\omega_2 \times width/length+\omega_3 \times ave(distance(point,central\_axis))+\omega_4 \times symmetry)$$

where $E_{dir}$ represents the energy function of a certain candidate orientation angle; $\omega_1$, $\omega_2$, $\omega_3$, $\omega_4$ represent weight values, and may be adjusted according to specific situations; area represents the area of the minimum enclosing rectangle corresponding to the candidate orientation angle; width/length represents the width-to-length ratio of the minimum enclosing rectangle corresponding to the candidate orientation angle; ave(distance(point, central_axis)) represents the average value of distances between point clouds in the minimum enclosing rectangle corresponding to the candidate orientation angle and the central axis; symmetry represents the symmetry of the minimum enclosing rectangle corresponding to the candidate orientation angle.

After obtaining the energy functions of candidate orientation angles of the automobile vehicles and non-automobile vehicles by calculating with different equations, the second determining unit 33 can determine the driving directions of the automobile vehicles and non-automobile vehicles according to the energy functions of candidate orientation angles.

The third determining unit 34 is configured to determine the driving direction of the vehicle from the candidate orientation angles, according to the energy functions.

Since the energy functions reflect the matching degree of the candidate orientation angles corresponding to the minimum enclosing rectangle of the vehicle and the actual driving direction, the third determining unit 34 can, according to the energy functions obtained from calculation, select the candidate orientation angle corresponding to an energy function optimal value as the orientation angle of the vehicle.

Upon determining the driving direction of the vehicle from the candidate orientation angle according to the energy functions, the third determining unit 34 further judges a head and a tail of the vehicle. This is because there might occur a situation the energy functions are equal in magnitude upon calculating the energy functions. For example, if the candidate orientation angle is an omnidirectional angle, if the energy function of 0° obtained from calculation is equal to the energy function of 180° in magnitude, the accurate driving direction of the vehicle cannot be judged. Therefore, it is impossible to implement accurate judgment of the driving direction of the vehicle by only using the energy functions of the candidate orientation angles of the vehicle. Therefore, the third determining unit 34 needs to further judge the head and tail of the vehicle and thereby more accurately determine the driving direction of the vehicle. Since the automobile vehicles and non-automobile vehicles have different appearance and structures, the heads and tails of the automobile vehicles and non-automobile vehicles are judged in different manners.

Specifically, the third determining unit 34 may judge the head of the automobile vehicle in the following manner: obtaining slopes of a front end and a rear end of the automobile vehicle according to side view data in the point cloud subset of the automobile vehicle, and determining the head of the automobile vehicle according to the obtained slopes. An end with the larger slope is the head of the vehicle, and the other end is the tail of the vehicle.

Specifically, the third determining unit 34 may judge the head of the non-automobile vehicle in the following manner: obtaining image data including the driving information of the non-automobile; determining the head of the non-automobile vehicle according to the driving speed and direction of the non-automobile vehicle in top n frames of image data. This is because the non-automobile device (e.g., motorcycle or bicycle) has a front-back symmetry, and the head of the automobile vehicle cannot be determined from the slopes of the front end and the back end. Therefore, the head of the non-automobile vehicle is determined according to the driving speed and direction of the non-automobile vehicle.

After obtaining the head of the vehicle, the third determining unit 34 determines vehicle's driving direction according to the energy functions corresponding to respective candidate orientation angles and head of the vehicle.

For example, if values of energy functions obtained from the candidate orientation angle 0° and candidate orientation angle 180° are the smallest and equal, and if the head of the vehicle is consistent with the driving direction of the autonomous vehicle, it is determined that the driving direction of the vehicle is 0°; if the head of the vehicle is opposite to the driving direction of the autonomous vehicle, it is determined that the driving direction of the vehicle is 180°.

Certainly, it may be understood that if the candidate orientation angle determined from comparison of vehicles, or the value of the energy function corresponding to the candidate orientation angle is sole, the driving direction of the vehicle can be directly determined according to the energy function of the candidate orientation angle.

After obtaining the driving direction of the vehicle, the third determining unit 34 may further calculate a confidence of the obtained driving direction of the vehicle. Specifically, the third determining unit 34, according to the minimum enclosing rectangle corresponding to the determined orientation angle of the vehicle, calculates an average value of shortest distances between point clouds in the minimum enclosing rectangle and edges of the minimum enclosing rectangles, or an average value of distances between point clouds and the central axis in the minimum enclosing rectangle; according to the average value obtained from calculation, obtain the confidence of the determined driving direction of the vehicle, wherein the smaller the average value is, the larger the confidence is.

Specifically, the third determining unit 34 may obtain the confidence of the driving direction of the automobile vehicle by using the following equation:

$$\text{confidence}=1/\text{ave}(\min(\text{distance}(\text{point},\text{edg})))$$

where confidence represents the confidence of the driving direction of the automobile vehicle; and ave(min(distance (point, edg))) represents the average value of shortest distances between each point cloud in the minimum enclosing rectangle and each edge.

Specifically, the third determining unit 34 may obtain the confidence of the driving direction of the non-automobile vehicle by using the following equation:

$$\text{confidence}=1/\text{ave}(\text{distance}(\text{point},\text{central\_axis}))$$

where confidence represents the confidence of the driving direction of the non-automobile vehicle; and ave(distance (point, central_axis)) represents the average value of distances between each point cloud in the minimum enclosing rectangle and the central axis.

The confidence obtained by the third determining unit 34 by calculating is regarded as a judging criterion of the driving direction of the vehicle. The larger the obtained confidence is, the more accurate the obtained vehicle driving direction is; the smaller the obtained confidence is, the less accurate the obtained vehicle driving direction is.

Figure 4:
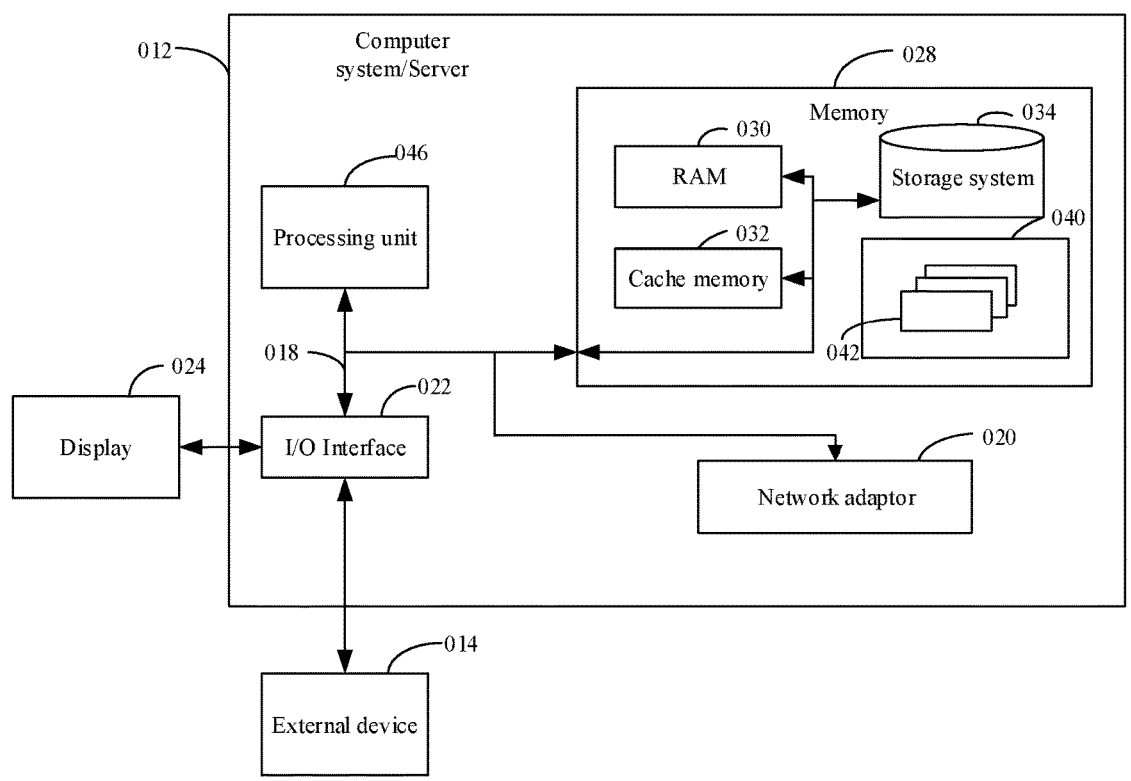
FIG. 4 is a block diagram of a computer system/server according to an embodiment of the present disclosure.

FIG. 4 illustrates a block diagram of an example computer system/server 012 adapted to implement an implementation mode of the present disclosure. The computer system/server 012 shown in FIG. 4 is only an example and should not bring about any limitation to the function and scope of use of the embodiments of the present disclosure.

As shown in FIG. 4, the computer system/server 012 is shown in the form of a general-purpose computing device. The components of computer system/server 012 may include, but are not limited to, one or more processors (processing units) 016, a system memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

System memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The system memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the method for judging a vehicle driving direction, which may comprise:

obtaining a point cloud subset of the vehicle and candidate orientation angles of the vehicle;

respectively determining a minimum enclosing rectangle of top view data in the point cloud subset, in the direction of each candidate orientation angle;

respectively determining energy functions corresponding to candidate orientation angles by using structural information of the respective minimum enclosing rectangles, the energy functions reflecting . . . ;

determining the driving direction of the vehicle from the candidate orientation angles, according to the energy functions.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure. For example, steps of methods executed by said one or more processors may include:

obtaining a point cloud subset of the vehicle and candidate orientation angles of the vehicle;

respectively determining a minimum enclosing rectangle of top view data in the point cloud subset, in the direction of each candidate orientation angle;

respectively determining energy functions corresponding to candidate orientation angles by using structural information of the respective minimum enclosing rectangles, the energy functions reflecting . . . ;

determining the driving direction of the vehicle from the candidate orientation angles, according to the energy functions.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof. Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for judging a vehicle driving direction, wherein the method comprises:
   obtaining a point cloud subset of the vehicle and candidate orientation angles of the vehicle;
   respectively determining a minimum enclosing rectangle of top view data in the point cloud subset, in the direction of each candidate orientation angle;
   determining energy functions corresponding to candidate orientation angles by using distribution properties of respective point clouds in the respective minimum enclosing rectangles relative to the minimum enclosing rectangles;
   determining the driving direction of the vehicle from the candidate orientation angles, according to the energy functions.

2. The method according to claim 1, wherein the point cloud subset of the vehicle is obtained in the following manner:
   obtaining point cloud data collected by collecting devices of an autonomous vehicle;
   after merging the point cloud data, clustering the merged point cloud data to obtain the point cloud subset with an object as a unit;
   recognizing and classifying the point cloud subset, and obtaining the point cloud subset of the vehicle.

3. The method according to claim 1, wherein the candidate orientation angle of the vehicle is obtained in the following manner:
   dividing an omnidirectional angle with a preset angle unit, and regarding the obtained angles as the candidate orientation angles respectively; or
   obtaining image data including vehicle driving information, and determining the candidate orientation angle according to vehicle driving speed and direction in top m frames of image data, wherein m is a preset positive integer; or
   determining the candidate orientation angle according to a direction of each edge of a convex polygon corresponding to the point cloud subset of the vehicle.

4. The method according to claim 1, wherein the distribution properties of respective point clouds in the respective minimum enclosing rectangles relative to the minimum enclosing rectangles include: at least one of area, width-to-length ratio, symmetry of the minimum enclosing rectangles, an average value of shortest distances between point clouds and edges of the minimum enclosing rectangles, and an average value of distances between point clouds and central axes of the minimum enclosing rectangles.

5. The method according to claim 1, wherein the determining energy functions corresponding to candidate orientation angles by using distribution properties of respective point clouds in the respective minimum enclosing rectangles relative to the minimum enclosing rectangles comprises: performing weighting processing for types of distribution properties of respective point clouds in the minimum enclosing rectangles relative to the minimum enclosing rectangles, and obtaining energy functions of candidate orientation angles corresponding to the minimum enclosing rectangles.

6. The method according to claim 1, wherein the vehicle comprises an automobile;
   the determining the driving direction of the vehicle from the candidate orientation angles, according to the energy functions comprises:
   obtaining slopes of a front end and a rear end of the automobile vehicle according to side view data in the point cloud subset, and determining the head of the automobile vehicle according to the slopes;
   determining the driving direction of the automobile vehicle according to the head of the automobile vehicle and the energy functions corresponding to the candidate orientation angles.

7. The method according to claim 1, wherein the vehicle comprises a non-automobile vehicle;
the determining the driving direction of the vehicle from the candidate orientation angles, according to the energy functions comprises:
obtaining image data including driving information of the non-automobile vehicle;
determining a head of the non-automobile vehicle according to driving speed and direction of the non-automobile vehicle in top n frames of image data, wherein n is a preset positive integer;
determining the driving direction of the non-automobile vehicle according to the head of the non-automobile vehicle and the energy functions corresponding to the candidate orientation angles.

8. The method according to claim 4, wherein the symmetry of the minimum enclosing rectangles is obtained in the following manner:
obtaining symmetry of point clouds in the minimum enclosing rectangles with a transverse central axis as a symmetry axis and with a longitudinal central axis as a symmetry axis;
selecting a larger symmetry from symmetries corresponding to the transverse central axis and longitudinal central axis, as a symmetry of the minimum enclosing rectangles.

9. The method according to claim 1, wherein the determining the driving direction of the vehicle from the candidate orientation angles, according to the energy functions further comprises:
according to the minimum enclosing rectangle corresponding to the determined orientation angle of the vehicle, calculating an average value of shortest distances between point clouds in the minimum enclosing rectangle and edges, or an average value of distances between point clouds and a central axis;
according to the average value, obtaining a confidence of the determined driving direction of the vehicle, wherein the smaller the average value is, the larger the confidence is.

10. A device, wherein the device comprises:
one or more processor;
a storage for storing one or more programs,
said one or more programs, when executed by said one or more processors, enable said one or more processors to implement a method for judging a vehicle driving direction, wherein the method comprises:
obtaining a point cloud subset of the vehicle and candidate orientation angles of the vehicle;
respectively determining a minimum enclosing rectangle of top view data in the point cloud subset, in the direction of each candidate orientation angle;
determining energy functions corresponding to candidate orientation angles by using distribution properties of respective point clouds in the respective minimum enclosing rectangles relative to the minimum enclosing rectangles;
determining the driving direction of the vehicle from the candidate orientation angles, according to the energy functions.

11. The device according to claim 10, wherein the point cloud subset of the vehicle is obtained in the following manner:
obtaining point cloud data collected by collecting devices of an autonomous vehicle;
after merging the point cloud data, clustering the merged point cloud data to obtain the point cloud subset with an object as a unit;
recognizing and classifying the point cloud subset, and obtaining the point cloud subset of the vehicle.

12. The device according to claim 10, wherein the candidate orientation angle of the vehicle is obtained in the following manner:
dividing an omnidirectional angle with a preset angle unit, and regarding the obtained angles as the candidate orientation angles respectively; or
obtaining image data including vehicle driving information, and determining the candidate orientation angle according to vehicle driving speed and direction in top m frames of image data, wherein m is a preset positive integer; or
determining the candidate orientation angle according to a direction of each edge of a convex polygon corresponding to the point cloud subset of the vehicle.

13. The device according to claim 10, wherein the distribution properties of respective point clouds in the respective minimum enclosing rectangles relative to the minimum enclosing rectangles include: at least one of area, width-to-length ratio, symmetry of the minimum enclosing rectangles, an average value of shortest distances between point clouds and edges of the minimum enclosing rectangles, and an average value of distances between point clouds and central axes of the minimum enclosing rectangles.

14. The device according to claim 10, wherein the determining energy functions corresponding to candidate orientation angles by using distribution properties of respective point clouds in the respective minimum enclosing rectangles relative to the minimum enclosing rectangles comprises:
performing weighting processing for types of distribution properties of respective point clouds in the minimum enclosing rectangles relative to the minimum enclosing rectangles, and obtaining energy functions of candidate orientation angles corresponding to the minimum enclosing rectangles.

15. The device according to claim 10, wherein the vehicle comprises an automobile;
the determining the driving direction of the vehicle from the candidate orientation angles, according to the energy functions comprises:
obtaining slopes of a front end and a rear end of the automobile vehicle according to side view data in the point cloud subset, and determining the head of the automobile vehicle according to the slopes;
determining the driving direction of the automobile vehicle according to the head of the automobile vehicle and the energy functions corresponding to the candidate orientation angles.

16. The device according to claim 10, wherein the vehicle comprises a non-automobile vehicle;
the determining the driving direction of the vehicle from the candidate orientation angles, according to the energy functions comprises:
obtaining image data including driving information of the non-automobile vehicle;
determining a head of the non-automobile vehicle according to driving speed and direction of the non-automobile vehicle in top n frames of image data, wherein n is a preset positive integer;
determining the driving direction of the non-automobile vehicle according to the head of the non-automobile vehicle and the energy functions corresponding to the candidate orientation angles.

17. The device according to claim 13, wherein the symmetry of the minimum enclosing rectangles is obtained in the following manner:
- obtaining symmetry of point clouds in the minimum enclosing rectangles with a transverse central axis as a symmetry axis and with a longitudinal central axis as a symmetry axis;
- selecting a larger symmetry from symmetries corresponding to the transverse central axis and longitudinal central axis, as a symmetry of the minimum enclosing rectangles.

18. The device according to claim 10, wherein the determining the driving direction of the vehicle from the candidate orientation angles, according to the energy functions further comprises:
- according to the minimum enclosing rectangle corresponding to the determined orientation angle of the vehicle, calculating an average value of shortest distances between point clouds in the minimum enclosing rectangle and edges, or an average value of distances between point clouds and a central axis;
- according to the average value, obtaining a confidence of the determined driving direction of the vehicle, wherein the smaller the average value is, the larger the confidence is.

19. A storage medium including computer-executable instructions which, when executed by a computer processor, execute a method for judging a vehicle driving direction, wherein the method comprises:
- obtaining a point cloud subset of the vehicle and candidate orientation angles of the vehicle;
- respectively determining a minimum enclosing rectangle of top view data in the point cloud subset, in the direction of each candidate orientation angle;
- determining energy functions corresponding to candidate orientation angles by using distribution properties of respective point clouds in the respective minimum enclosing rectangles relative to the minimum enclosing rectangles;
- determining the driving direction of the vehicle from the candidate orientation angles, according to the energy functions.

20. The storage medium according to claim 19, wherein the point cloud subset of the vehicle is obtained in the following manner:
- obtaining point cloud data collected by collecting devices of an autonomous vehicle;
- after merging the point cloud data, clustering the merged point cloud data to obtain the point cloud subset with an object as a unit;
- recognizing and classifying the point cloud subset, and obtaining the point cloud subset of the vehicle.

* * * * *